(12) United States Patent
Cho

(10) Patent No.: US 10,800,229 B2
(45) Date of Patent: Oct. 13, 2020

(54) SUN VISOR MODULE

(71) Applicant: Mingyu Cho, Pohang-si (KR)

(72) Inventor: Mingyu Cho, Pohang-si (KR)

( * ) Notice: Subject to any disclaimer, the term of this patent is extended or adjusted under 35 U.S.C. 154(b) by 84 days.

(21) Appl. No.: 16/319,944

(22) PCT Filed: Aug. 16, 2016

(86) PCT No.: PCT/KR2016/008995
§ 371 (c)(1),
(2) Date: Jan. 23, 2019

(87) PCT Pub. No.: WO2018/030565
PCT Pub. Date: Feb. 15, 2018

(65) Prior Publication Data
US 2019/0263229 A1 Aug. 29, 2019

(30) Foreign Application Priority Data

Aug. 12, 2016 (KR) .................. 10-2016-0102736

(51) Int. Cl.
*B60J 3/02* (2006.01)
*B60J 1/20* (2006.01)
(Continued)

(52) U.S. Cl.
CPC ........... *B60J 3/0243* (2013.01); *B60J 1/2013* (2013.01); *B60J 3/00* (2013.01); *B60J 3/02* (2013.01);
(Continued)

(58) Field of Classification Search
CPC . B60J 3/0243; B60J 1/2013; B60J 3/00; B60J 3/02; B60J 7/02; F16H 19/04; B60H 2001/00214; B60H 2001/00235
See application file for complete search history.

(56) References Cited

U.S. PATENT DOCUMENTS

| 2005/0092005 A1* | 5/2005 | Wunderlich | B60H 1/00428 62/244 |
| 2005/0285427 A1* | 12/2005 | Asai | B60J 3/0243 296/97.11 |
| 2011/0097985 A1* | 4/2011 | Stauffer | B60J 5/04 454/162 |

FOREIGN PATENT DOCUMENTS

| DE | 102008063153 A1 * | 8/2009 | ............ B60J 3/0204 |
| DE | 102011104820 A1 * | 1/2012 | ............ B60J 3/0243 |

(Continued)

OTHER PUBLICATIONS

International Search Report for PCT/KR2016/008995 dated May 8, 2017 from Korean Intellectual Property Office.

*Primary Examiner* — Lori L Lyjak
(74) *Attorney, Agent, or Firm* — Paratus Law Group, PLLC

(57) ABSTRACT

A sun visor module includes: a base portion which has an accommodating space formed therein and a front portion provided at the ceiling of a front seat of a vehicle in an openable or closable form; a sun visor portion which is provided at the center of the inside of the base portion and slides in or out through the front portion of the base portion; a screen-shaped awning portion which is provided at a lower portion of the inside of the base portion to be entered in or out to the front portion of the base portion; an air discharge portion which is connected with an A-pillar of the vehicle to introduce the wind flowing in the A-pillar into the base portion; and a first blowing portion which communicates with the rear lower portion of the base portion to send the wind to the inside of the vehicle.

9 Claims, 4 Drawing Sheets

(51) Int. Cl.
   *B60J 7/02*      (2006.01)
   *F16H 19/04*     (2006.01)
   *B60J 3/00*      (2006.01)
   *B60H 1/00*      (2006.01)

(52) U.S. Cl.
   CPC ............... *B60J 7/02* (2013.01); *F16H 19/04* (2013.01); *B60H 2001/00214* (2013.01); *B60H 2001/00235* (2013.01)

(56) References Cited

FOREIGN PATENT DOCUMENTS

| | | | |
|---|---|---|---|
| DE | 202013005877 U1 * | 8/2013 | ......... B60H 1/00407 |
| FR | 2827225 A1 * | 1/2003 | ............ B60J 3/0204 |
| JP | S63-169312 U | 11/1988 | |
| JP | 2002-331822 A | 11/2002 | |
| JP | 2006-218976 A | 8/2006 | |
| JP | 2007-083929 A | 4/2007 | |
| JP | 2010-260547 A | 11/2010 | |
| KR | 10-2008-0068389 A | 7/2008 | |

* cited by examiner

SUN VISOR MODULE

CROSS REFERENCE TO PRIOR APPLICATION

This application is a National Stage Patent Application of PCT International Patent Application No. PCT/KR2016/008995 (filed on Aug. 16, 2016) under 35 U.S.C. § 371, which claims priority to Korean Patent Application No. 10-2016-0102736 (filed on Aug. 12, 2016), which are all hereby incorporated by reference in their entirety.

BACKGROUND

The present invention relates to a sun visor module, and more particularly, to a sun visor module capable of effectively blocking light and heat transmitted through a wind shield of a vehicle and increasing the cooling efficiency.

The cooling efficiency is low due to heat and light transmitted through a wind shield of a vehicle even if an air conditioner was turned on in the strong light and hot weather such as in summer.

In order to block the light, the vehicle is generally provided with a sun visor to block some light.

However, a general sun visor module is configured only in a form of the wind shield that simply blocks light directly acting to the driver's eye, and thus a method for more efficiently blocking light and heat transmitted into the vehicle is required.

In this regard, in the related art, a "multi-functional sun visor" is disclosed in Korean Patent Application Publication No. 10-2008-00068389 published on Jul. 23, 2008, which is a sun visor configured to unfold a screen for blocking light on the front of a wind shield of a vehicle, but there is a problem in that heat and light may not be blocked during traveling and the sun visor may be used only when parking.

SUMMARY

Therefore, the present invention is contrived to solve the problems in the related art as described above, and an object of the present invention is to provide a sun visor module capable of blocking heat and light transmitted through a wind shield of a vehicle.

Another object of the present invention is to provide a sun visor module capable of enhancing cooling efficiency by emitting the air-conditioner wind through the ceiling of the vehicle.

Objects to be solved by the present invention are not limited to the aforementioned objects, and other objects to be solved by the present invention which are not mentioned therein will be clearly understood by those skilled in the art from the following description.

A sun visor module according to the present invention includes a base portion which has an accommodating space formed therein and a front portion provided at the ceiling of a front seat of a vehicle in an openable or closable form; a sun visor portion which is provided at the center of the inside of the base portion and slides in or out through the front portion of the base portion; a screen-shaped awning portion which is provided at a lower portion of the inside of the base portion to be entered in or out to the front portion of the base portion; an air discharge portion which is connected with an A-pillar of the vehicle to introduce the wind flowing in the A-pillar into the base portion; and a first blowing portion which communicates with the rear lower portion of the base portion to send the wind to the inside of the vehicle.

The sun visor module according to the present invention has an effect of blocking heat and light transmitted through a wind shield of a vehicle.

Further, the air conditioner wind is emitted through the ceiling of the vehicle, thereby enhancing the cooling efficiency inside the vehicle.

Further, the sun visor portion is in close contact with the wind shield of the vehicle to block the light, thereby securing a wider view of a driver.

DETAILED DESCRIPTION

Specific matters including problems to be solved for the present invention, a solving means of the problems, and the effect of the invention for the present invention are included in exemplary embodiments and drawings to be described below. Advantages and features of the present invention, and methods for accomplishing the same will be more clearly understood from exemplary embodiments described in detail below with reference to the accompanying drawings.

Figure 1:
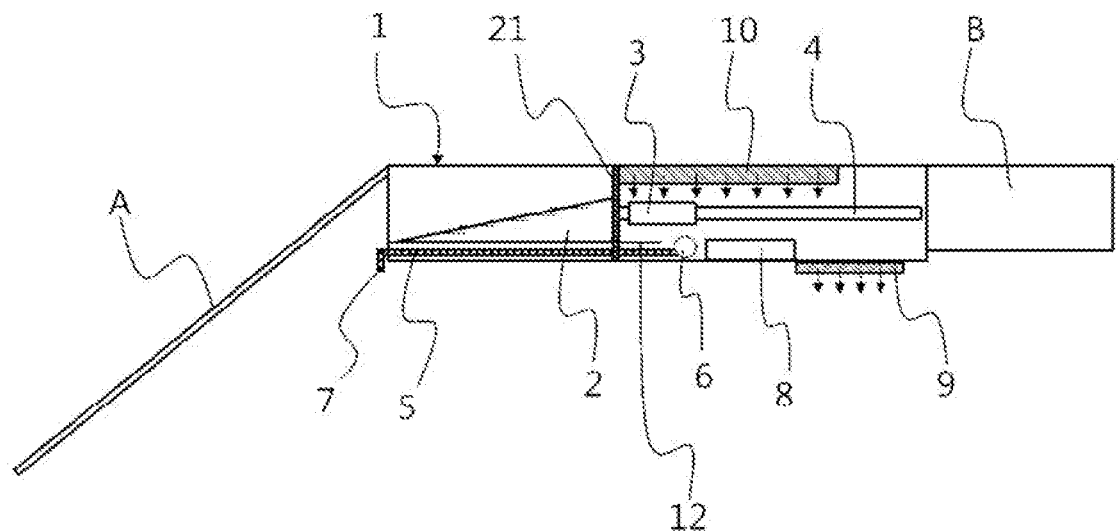
FIG. 1 is a side view illustrating a basic state of a sun visor module according to the present invention.
Figure 2:
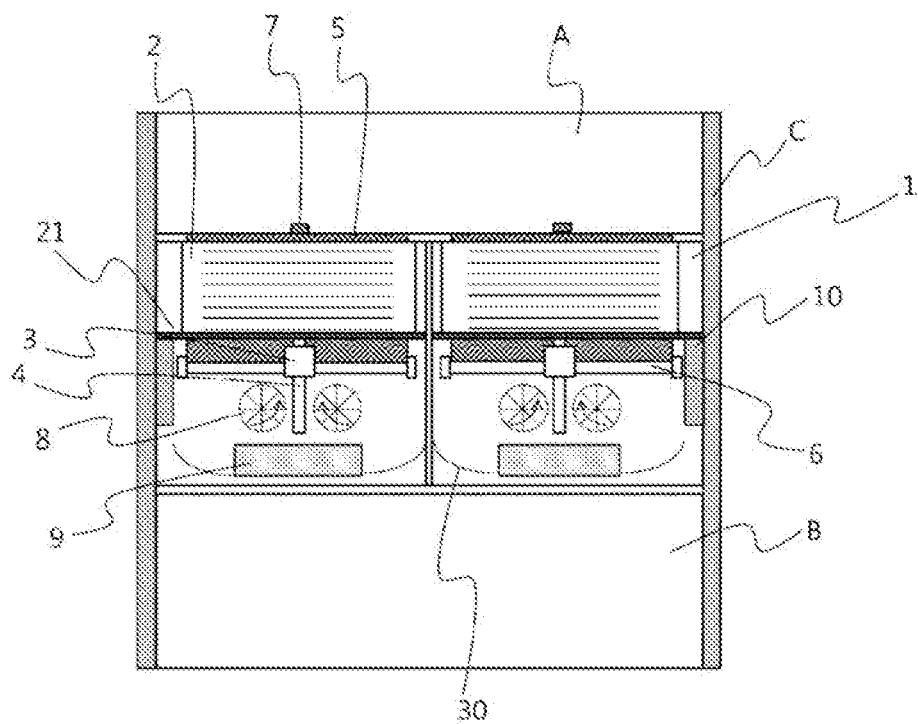
FIG. 2 is a plan view illustrating the basic state of the sun visor module according to the present invention.

As illustrated in FIGS. 1 and 2, a sun visor module according to the present invention includes a base portion 1 which has an accommodating space formed therein and a front portion provided at the ceiling of a front seat of a vehicle in an openable or closable form, a sun visor portion 2 which is provided at the center of the inside of the base portion 1 and slides in or out through the front portion of the base portion 1, a screen-shaped awning portion 5 which is provided at a lower portion of the inside of the base portion 1 to be entered into or out to the front portion of the base portion, an air discharge portion 10 which is connected with an A-pillar C of the vehicle to introduce the wind flowing in the A-pillar C into the base portion 1, and a first blowing portion 9 which communicates with the rear lower portion of the base portion 1 to send the wind to the inside of the vehicle.

First, the base portion 1 has the accommodating space formed therein and the front portion provided at the ceiling of a front seat of the vehicle in an openable or closable form.

Particularly, the base portion 1 is preferably provided in a space between a space where a sunroof B is formed at the ceiling of the vehicle and a wind shield A.

A cover portion (not illustrated) is provided at the front portion of the base portion 1.

The cover portion (not illustrated) is openably configured, and is configured to be automatically opened when the sun visor portion 2 is advanced toward the front portion and automatically closed when the sun visor portion 2 is recovered into the base portion 1.

The cover portion (not illustrated) may be configured in any form as long as it is automatically opened and closed.

Rails 12 are formed on one side and the other side of the inner wall surface of the base portion 1.

The rails 12 are seated on the sun visor portion 2 below and slidably configured.

Next, the sun visor portion 2 is provided at the center of the inside of the base portion 1 and is slidable in or out toward the front portion of the base portion 1.

It is preferable that the sun visor portion 2 is seated on the rails 12 to slide.

As illustrated in FIGS. 2 to 5, the bottom surface of the sun visor portion 2 is provided in a plate-like shape so as to easily block the light, and the upper portion is formed with an inclined surface inclined downward toward the front portion.

In addition, the rear end portion is configured to be opened so as to accommodate the wind introduced into the base portion 1 into the sun visor portion.

A through hole is formed in the inclined surface, and a second blowing portion 13 is provided so that the wind introduced into the base portion 1 may be discharged.

The reason why the second blowing portion 13 is provided on the inclined surface is that the wind may flow along the surface of the wind shield A when blowing the wind introduced into the base portion 1 into the vehicle.

Since the wind discharged through the second blowing portion 13 formed on the inclined surface is blown toward the wind shield A at an oblique angle, the wind easily flows along the wind shield A.

As a result, the heat introduced through the wind shield A may be effectively blocked by the wind formed in the form of a film, thereby enhancing the cooling efficiency inside the vehicle.

In addition, the cold wind and the hot wind may be directly transmitted to the wind shield A, thereby effectively removing the frost formed on the wind shield A in the winter.

Figure 3:
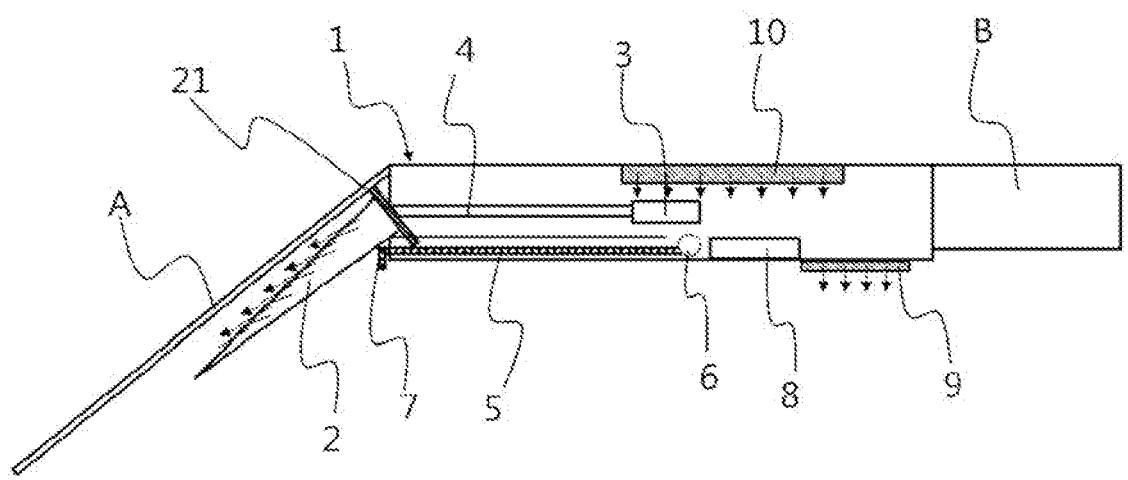
FIG. 3 is a side view illustrating a state in which a sun visor portion slides in the sun visor module according to the present invention.
Figure 4:
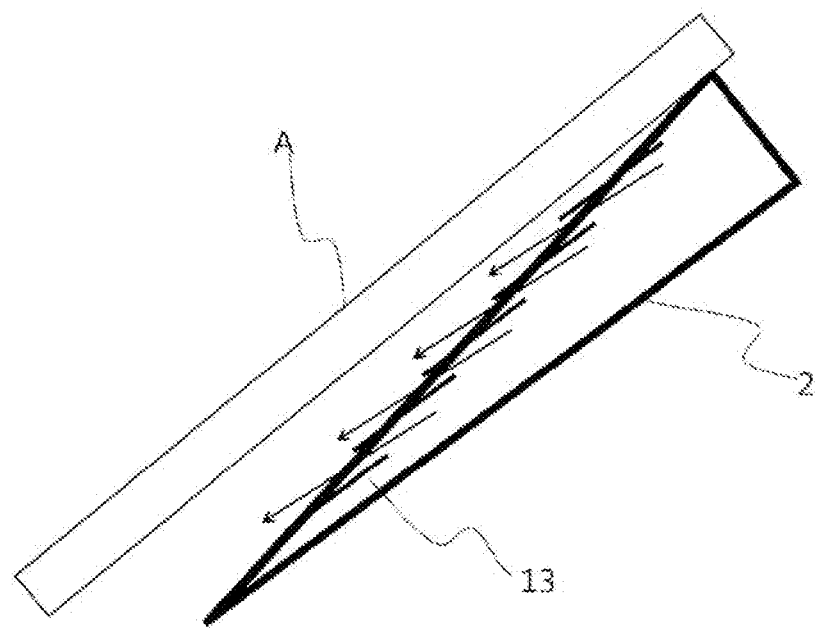
FIG. 4 is a view illustrating a state in which the sun visor portion slides to block light in the sun visor module according to the present invention.

Particularly, as illustrated in FIGS. 3 and 4, the sun visor portion 2 slides toward the front portion of the base portion 1 to block light introduced to the wind shield A, and simultaneously, a wind break is formed along the wind shield A by the wind blown through the second blowing portion 13 to block the heat introduced into the vehicle, thereby maximizing the cooling efficiency in the vehicle.

Figure 5:
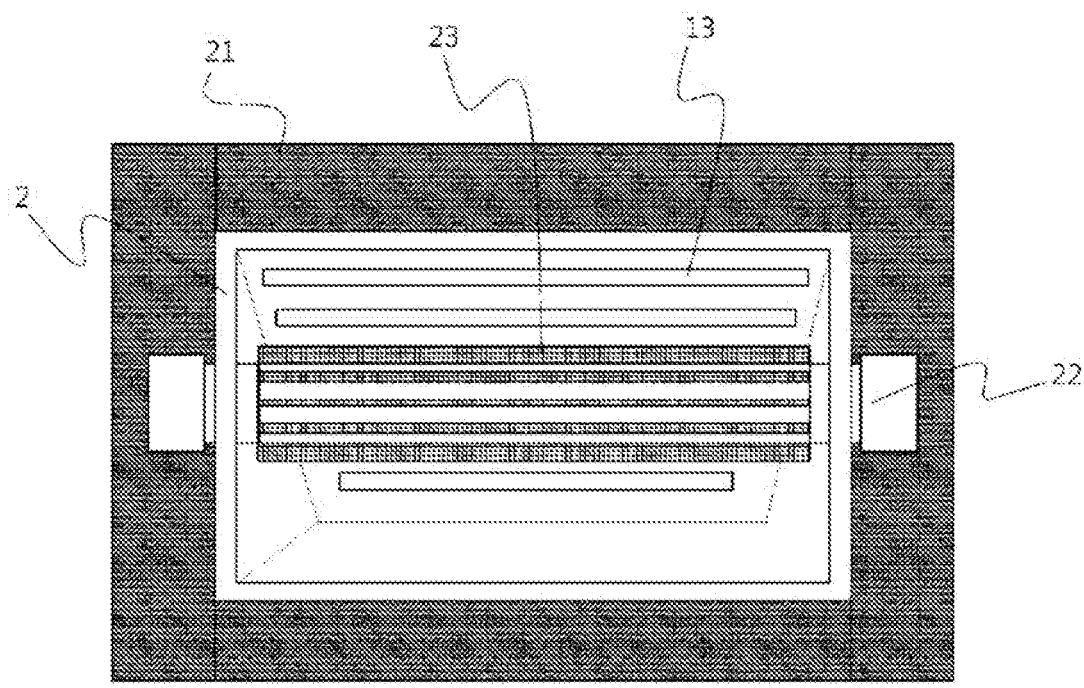
FIG. 5 is a rear view illustrating the sun visor portion in the sun visor module according to the present invention.
Figure 6:
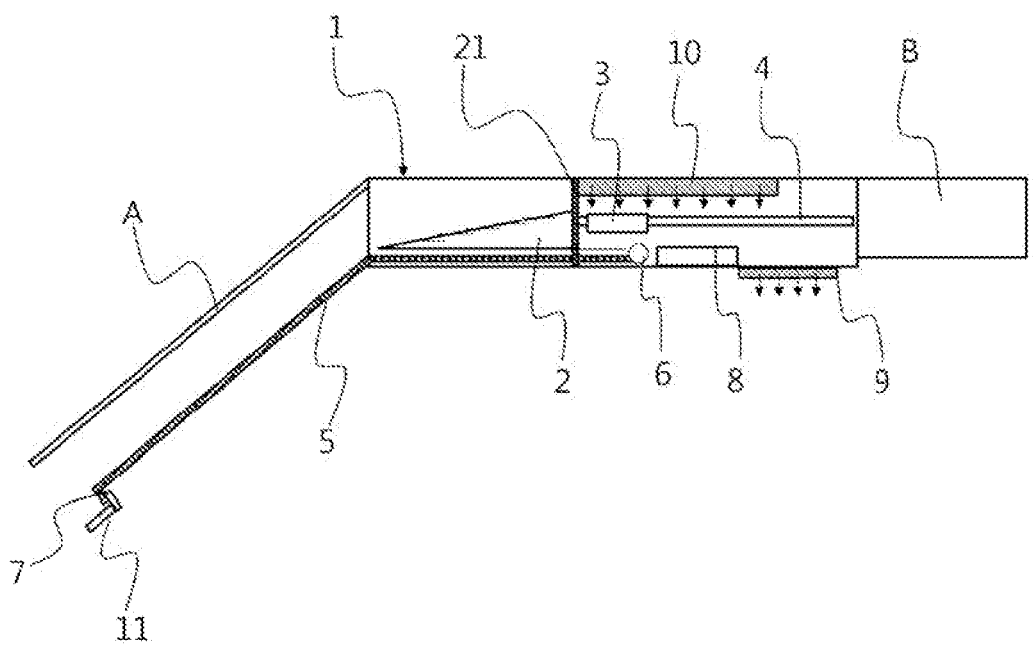
FIG. 6 is a side view illustrating a state in which an awning portion is unfolded in the sun visor module according to the present invention.

Further, as illustrated in FIG. 5, the sun visor portion 2 is provided with a sealing portion 21 formed vertically outward along the edge of the rear end portion.

It is preferable that the sealing portion 21 is made of a flexible and elastic material such as silicone or rubber.

It is possible to prevent the wind flowing into the base portion 1 from flowing out of the base portion 1 through an outer space of the sun visor portion 2 by the sealing portion 21.

As illustrated in FIG. 5, the sun visor portion 2 is provided with a rotary shaft 22 in the form of a rotary shaft which is through-connected to both sides of the rear end portion.

The front portion of the sun visor portion 2 is vertically rotatable by the rotary shaft 22.

Accordingly, as illustrated in FIG. 3, when the sun visor portion 2 slides to the front portion of the base portion 1, the front end portion of the sun visor portion 2 naturally rotates downward along the wind shield A.

Further, the sun visor portion 2 may be further provided with a sun visor fan 23 having blades formed radially along the outer circumferential surface of the rotary shaft 22 and having the same rotary shaft as the rotary shaft 22.

As illustrated in FIG. 5, the sun visor fan 23 is rotatably provided on the rotary shaft 22, and connected to a motor provided at one side of the rotary shaft 22 so as to effectively introduce the wind flowing into the base portion 1 into the sun visor portion 2.

The sun visor portion 2 is provided with a first motor 3 and a gear portion 4 connected to each other in order to effectively slide forward and backward of the base portion 1.

The first motor 3 and the gear portion 4 may be configured in any form so long as the sun visor portion 2 smoothly slides forward and backward in the base portion 1.

Specifically, the gear portion 4 is vertically connected to the rear end portion of the sun visor portion 2.

It is preferable that the gear portion is provided in the form of a bar having teeth such as a rack gear.

Next, the first motor 3 is provided at the rear side of the sun visor portion 2 to be connected with the gear portion.

At this time, the first motor 3 is provided with a worm gear having a screw-shaped screw.

The first motor slides forward and backward of the sun visor portion by the rotation of the engaged rack gear through the rotation of the worm gear.

The reason configured as described above is that the sun visor portion 2 smoothly slides forward and backward, so that a reduction gear ratio is greatly lowered in combination of the worm gear and the rack gear, which are rotated by the first motor 3, thereby lowering a moving speed of the sun visor portion forward and backward.

Next, the awning portion 5 is provided at the lower portion of the inside of the base portion 1 and provided in the form of a screen entered in or out toward the front portion of the base portion 1.

As illustrated in FIG. 5, the awning portion 5 is a screen-shaped film for blocking light from being transmitted to the inside of the vehicle, made of a flexible material wound on a roller portion 6 below, and configured with a size enough to be unfolded on the front surface of the wind shield A.

Particularly, the awning portion 5 further includes a roller portion 6 and a hook portion 7.

First, the roller portion 6 is provided inside the base portion 1 and is provided with a rotary shaft perpendicular to the front direction of the base portion 1.

Further, the roller portion 6 is configured to be able to wind the awning portion 5 elastically when no force is applied.

Particularly, it is preferable that a spring is provided on the inner side of the roller portion 6 so that an elastic force is formed in a direction to wind the awning portion 5.

The hook portion 7 is provided with a hook-shaped ring at the end portion of the awning portion 5.

The hook portion 7 is configured to be seated on one side of the front end portion of the base portion 1 and serves as a hooker so as not to be completely rolled into the base portion 1 when the awning portion 5 is wound by the roller portion 6.

In addition, it is preferable that the hook portion 7 is formed to have a size capable of serving as a handle so that the user may easily pull the awning portion 5.

When the front surface of the wind shield A is blocked by using the awning portion 5, a ring-shaped hook fixing portion 11 is further provided on a dashboard of the vehicle, and the hook portion 7 is fixed to the hook fixing portion 11 to fix the awning portion 5 in an unfolded state and block the front surface of the wind shield A.

Next, the air discharge portion 10 is connected to the A-pillar C of the vehicle and provided to introduce the wind to be introduced through the A-pillar C into the base portion 1.

First, in order to be configured as described above, wind (air conditioner, heater) generated inside the vehicle is configured to be movable through the A-pillar C of the vehicle.

As illustrated in FIG. 2, the air discharge portion 10 is provided on one side of the A-pillar C, and has a through hole formed to introduce the wind (air conditioner, heater) supplied through the A-pillar C into the base portion 1 to supply the wind.

The wind supplied through the air discharge portion 10 flows into the base portion 1 to be supplied to the inside of the vehicle through the first blowing portion 9 and the second blowing portion 13.

Next, the first blowing portion 9 communicates with the inner lower portion of the base portion 1 to supply the wind to the inside of the vehicle.

Since the first blowing portion 9 is formed, the wind may be blown from the ceiling portion of the vehicle, thereby enhancing the cooling efficiency.

At this time, it is preferable that in the first blowing portion 9, an inlet through which the wind is discharged is formed in a zigzag shape.

This is because the wind of the first blowing portion 9 may be directly injected to the head of the driver of the vehicle, so that the wind passes through the zigzag-shaped inlet and soft cold wind is supplied to the driver by reducing the intensity of the wind.

Next, the fan portion 8 is provided in the lower portion of the inside of the base portion 1 to induce the wind toward the sun visor portion 2.

Particularly, as illustrated in FIG. 2, the fan portion 8 is provided with two fans on both sides of the lower inner side of the base portion 1 to induce the wind toward the sun visor portion 2.

At this time, the fan portion 8 rotates by rotating the two fans in opposite directions so that the wind may be moved between the fan portions 8 to smoothly move toward the sun visor portion 2.

Figure 7:
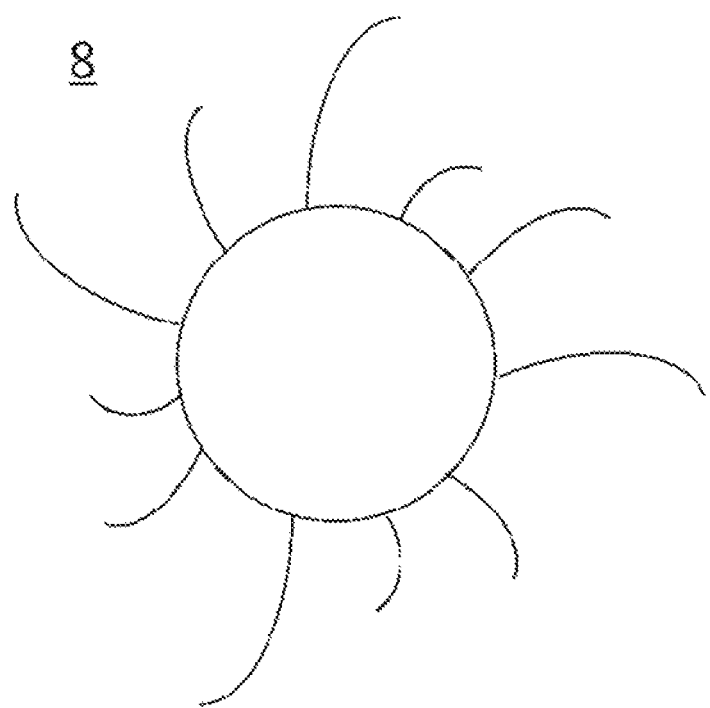
FIG. 7 is a view schematically illustrating a shape of a fan portion in the sun visor module according to the present invention.

At this time, as illustrated in FIG. 7, it is preferable that blades of the fans forming the fan portion 8 are irregularly sized and shaped.

This is to minimize noise due to the rotation of the fans.

Further, a light sensor portion (not illustrated) may be further provided on the front portion of the base portion 1 to measure an angle at which light is transmitted.

The angle of the light transmitted to the wind shield A may be measured by the light sensor portion to automatically control an angle at which the sun visor portion 2 blocks the light.

In addition, it is preferable that a ball, a roller, and the like are provided on the inside of the front portion of the base portion 1 to minimize friction when the sun visor portion 2 slides.

In addition, it is preferable that a wind break portion 30 is further provided on the inner lower portion of the base portion 1 so that the wind may be induced smoothly to the first blowing portion 9.

The wind break portion 30 may minimize the loss of the wind and discharge the wind to the first blowing portion 9.

Hereinafter, functions of the present invention configured above will be described.

First, as illustrated in FIG. 1, when the sun visor module according to the present invention is not used, the front portion of the base portion 1 is covered with a cover.

When the light transmitted through the wind shield A is strong, as illustrated in FIG. 3, the first motor 3 is driven by an operation such as button pressing so that the sun visor portion 2 slides to the front portion of the base portion 1.

At this time, when the air conditioner or the like is turned on, the wind is introduced into the base portion 1 through the air discharge portion 10 along the A-pillar C.

The introduced wind is introduced into the vehicle through the first blowing portion 9 and the second blowing portion 13.

The wind introduced to the second blowing portion 13 flows along the wind shield A of the vehicle, thereby effectively blocking the heat introduced through the wind shield A.

The wind introduced to the first blowing portion 9 is introduced through the ceiling portion of the vehicle, so that the driver can feel the coolness quickly, and the cooling efficiency is improved due to the characteristics of the sinking cold air.

In addition, in order to prevent the internal temperature of the vehicle from rising sharply due to the heat introduced into the inside of the vehicle during outdoor parking when the light is hot, such as in the summer, the awning portion 5 may be used.

As illustrated in FIG. 5, the awning portion 5 is pulled so as to hook the hook portion 7 to the hook fixing portion 11.

Accordingly, most of direct light transmitted through the wind shield A of the vehicle is blocked, thereby greatly reducing the internal temperature.

When the hook portion 7 is released from the hook fixing portion 11, the awning portion 5 is rolled by the elasticity of the roller portion 6.

As described above, it will be understand to those skilled in the art that a technical configuration of the present invention can be easily executed in other detailed forms without changing the technical spirit or an essential feature thereof.

Therefore, the exemplary embodiments described as above are illustrative in all aspects and should be understood as not being restrictive and the scope of the present invention is represented by claims to be described below rather than the detailed description, and it is to be interpreted that the meaning and scope of the claims and all the changes or modified forms derived from the equivalents thereof come within the scope of the present invention.

The invention claimed is:

1. A sun visor module comprising:
   a base portion which has an accommodating space formed therein and a front portion provided at the ceiling of a front seat of a vehicle in an openable or closable form;
   a sun visor portion which is provided at the center of the inside of the base portion and slides in or out through the front portion of the base portion;
   a screen-shaped awning portion which is provided at a lower portion of the inside of the base portion to be entered in or out to the front portion of the base portion;
   an air discharge portion which is connected with an A-pillar of the vehicle to introduce the wind flowing in the A-pillar into the base portion; and
   a first blowing portion which communicates with the rear lower portion of the base portion to send the wind to the inside of the vehicle.

2. The sun visor module of claim 1, further comprising:
a fan portion which is provided in the lower portion of the inside of the base portion to induce the wind toward the sun visor portion.

3. The sun visor module of claim 2, wherein blades of the fan portion are irregularly sized and shaped.

4. The sun visor module of claim 1, wherein the sun visor portion has an inclined surface inclined downward toward the front portion and has a rear end portion which is opened, and a second blowing portion is provided on the inclined surface so that the wind introduced through the opened end portion is injected.

5. The sun visor module of claim 4, wherein the sun visor portion further includes a sealing portion which is formed vertically outward along the edge of the rear end portion to block air flowing out of the sun visor portion.

6. The sun visor module of claim 4, wherein the sun visor portion further includes
- a rotary shaft in the form of a rotary shaft which is through-connected to both sides of the rear end portion; and
- a sun visor fan having blades formed radially along the outer circumferential surface of the rotary shaft and having the same rotary shaft as the rotary shaft.

7. The sun visor module of claim 1, wherein the sun visor portion includes
- a gear portion which is vertically connected to the rear end portion of the sun visor portion; and
- a first motor which is connected to the gear portion to control forward and backward moving of the sun visor portion.

8. The sun visor module of claim 1, wherein the awning portion further includes
- a roller portion which is formed in the base portion and provided with a rotary shaft perpendicular to the front direction of the base portion to wind the awning portion; and
- a hook portion which is provided with a hook-shaped ring at the front portion of the awning portion.

9. The sun visor module of claim 1, wherein in the first blowing portion, an inlet through which the wind is discharged is formed in a zigzag shape.

* * * * *